United States Patent
Schuler

(10) Patent No.: US 11,030,838 B2
(45) Date of Patent: Jun. 8, 2021

(54) ONBOARD SYSTEM FOR A VEHICLE AND PROCESS FOR SENDING A COMMAND TO A PARK AREA ACCESS SYSTEM

(71) Applicant: VALEO COMFORT AND DRIVING ASSISTANCE, Créteil (FR)

(72) Inventor: Stephane Schuler, Shenzhen (CN)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 0 days.

(21) Appl. No.: 16/134,388

(22) Filed: Sep. 18, 2018

(65) Prior Publication Data

US 2019/0088058 A1 Mar. 21, 2019

(30) Foreign Application Priority Data

Sep. 18, 2017 (CN) .......................... 201710844178.8

(51) Int. Cl.
| | |
|---|---|
| *G07C 9/00* | (2020.01) |
| *H04W 4/44* | (2018.01) |
| *G06K 9/00* | (2006.01) |
| *H04N 5/232* | (2006.01) |

(52) U.S. Cl.
CPC ..... *G07C 9/00896* (2013.01); *G06K 9/00335* (2013.01); *G06K 9/00597* (2013.01); *G06K 9/00832* (2013.01); *G06K 9/00845* (2013.01); *G07C 9/00563* (2013.01); *H04W 4/44* (2018.02); *G07C 2009/00849* (2013.01); *G07C 2009/00928* (2013.01); *H04N 5/232* (2013.01); *H04N 5/23219* (2013.01)

(58) Field of Classification Search
CPC ............ G07C 9/00896; G07C 9/00563; G07C 2009/00928; H04W 4/44; G06K 9/00335; G06K 9/00845; H04N 5/232
USPC ......................................................... 348/156
See application file for complete search history.

(56) References Cited

U.S. PATENT DOCUMENTS

| | | | | |
|---|---|---|---|---|
| 2009/0261979 A1* | 10/2009 | Breed | ................ | G01F 23/0076 340/576 |
| 2014/0276090 A1* | 9/2014 | Breed | ................ | A61B 5/14546 600/473 |
| 2015/0015710 A1* | 1/2015 | Tiryaki | ................ | B60R 1/00 348/148 |
| 2015/0019459 A1* | 1/2015 | Han | ................ | G06F 3/04883 706/11 |
| 2015/0038231 A1* | 2/2015 | Mahlmeister | ................ | A63F 13/06 463/37 |
| 2015/0066545 A1* | 3/2015 | Kotecha | ................ | G06Q 10/02 705/5 |

(Continued)

*Primary Examiner* — Joseph G Ustaris
*Assistant Examiner* — Matthew David Kim
(74) *Attorney, Agent, or Firm* — Osha Bergman Watanabe & Burton LLP

(57) ABSTRACT

An onboard system (4) for a vehicle (2) comprising:—an emitter circuit (8) suitable to send a command (C) to a park area access system (22);—an image sensor (6) suitable to capture a sequence of images (S) of at least part of a body of a driver (D) of the vehicle (2); and—a control module (10) suited to process said sequence of images (S) so as to identify a behavioral feature and then control the emitter circuit (8) to send the command (C) to the park area access system (22) provided the identified behavioral feature corresponds to a predetermined behavioral feature. A corresponding process is also proposed.

11 Claims, 1 Drawing Sheet

(56) References Cited

U.S. PATENT DOCUMENTS

| | | | |
|---|---|---|---|
| 2015/0261298 A1* | 9/2015 | Li | G01H 17/00 |
| | | | 345/156 |
| 2016/0311400 A1* | 10/2016 | Gennermann | B60R 25/2018 |
| 2017/0127230 A1* | 5/2017 | Enriquez | G08G 1/017 |
| 2018/0116560 A1* | 5/2018 | Quinn | A61B 5/1121 |

* cited by examiner

ONBOARD SYSTEM FOR A VEHICLE AND PROCESS FOR SENDING A COMMAND TO A PARK AREA ACCESS SYSTEM

TECHNICAL FIELD OF THE INVENTION

The invention relates to improvements in the area of park area access systems, such as garage door openers.

More precisely the invention relates to an onboard system for a vehicle and to a method of sending a command to a park area access system.

BACKGROUND INFORMATION AND PRIOR ART

In many regions around the world, it is common to have a garage door opening system motorized and remotely controllable from the vehicle, also known as a universal garage door opening (UGDO) system. The UGDO system typically includes a garage door opener (GDO) located within the vehicle, for example on the rearview mirror interior of the vehicle, which is programmable to learn the characteristics of the garage door signal which a garage door transceiver expects to receive for controlling the garage door. The garage door opener features a learning mode, which may be entered by using a dedicated Human Machine Interface (HMI). In learning mode, the garage door opener scans the garage door signal from the handheld remote terminal to learn its characteristics and credentials. Subsequently, when prompted by the user, the garage door opener wirelessly transmits a signal having the characteristics and credentials of the handheld remote terminal to the garage door receiver that controls the garage door. When trained, it is no longer needed to carry along the handheld remote terminal or leave it in the vehicle, which is good for theft prevention.

The UGDO transceiver located within the vehicle is usually triggered by a specific human machine interface, or HMI (often a push button), which is often integrated in the overhead console or the rear view mirror.

SUMMARY OF THE INVENTION

In this context, the invention provides an onboard system for a vehicle comprising an emitter circuit suitable to send a command to a park area access system, an image sensor suitable to capture a sequence of images of at least part of a body of a driver of the vehicle, and a control module suited to process said sequence of images so as to identify a behavioral feature and then control the emitter circuit to send the command to the park area access system provided the identified behavioral feature corresponds to a predetermined behavioral feature.

Controlling the park area access system subsequent to identifying a particular behavioral feature of the driver greatly simplifies the task of the driver when approaching the park area.

According to possible optional features:
the control module is suited to associate the identified behavioral feature with said command among a plurality of commands (e. g. among a dictionary of commands);
the predetermined behavioral feature is a predetermined gesture;
the predetermined behavioral feature is a predetermined lip movement;
the control module is suited to acquire a set of sequenced images showing said predetermined behavioral feature in a learning mode and/or to record a data representation of said predetermined behavioral feature in a memory;
the control module is further suited to analyze said sequence of images so as to produce a driving ability level.

The invention also provides a method of sending a command to a park area access system, comprising the following steps:
capturing, by an image sensor, a sequence of images of at least part of a body of a vehicle driver;
processing said sequence of images so as to identify a behavioral feature;
controlling an emitter circuit to send the command to the park area access system provided the identified behavioral feature corresponds to a predetermined behavioral feature.

This method may also comprise the steps of:
receiving said command at said park area access system;
operating a mechanism of said park area access system, thereby enabling the vehicle access to said park area.

Optional features presented above in connection with the onboard system may also apply to this method.

Other features and advantages of the embodiments of the present invention will be better understood upon reading of preferred embodiments thereof with reference to the appended drawings.

DETAILED DESCRIPTION OF EXAMPLE(S)

Figure 1:
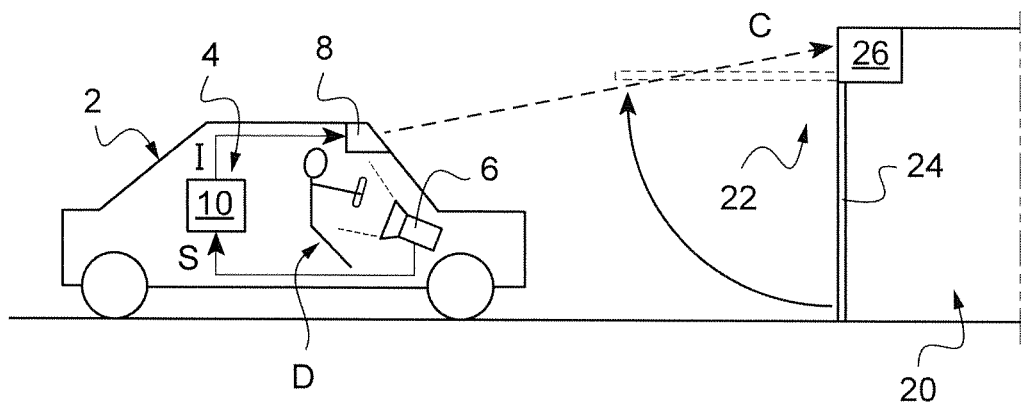
FIG. 1 represents the possible context of use of the invention.

FIG. 1 shows a possible context in which the invention may be used. The invention is however not limited to this possible context.

In this context, a vehicle 2 is about to enter a park area 20 (here a garage) secured by an access system 22.

The access system 22 includes here a garage door 24; according to a possible variation, the access system may include an elevator making it possible for the vehicle to access the park area.

The access system 22 also includes a mechanism 26 for operating (e.g. opening or closing) the garage door 24. The mechanism 26 can be remotely controlled, i.e. activated when receiving a wireless command C with valid credentials. The mechanism 26 is designed to operate the access system 22 (here to open the garage door 24) when receiving the wireless command C (e.g. a radiofrequency signal as mentioned below).

The vehicle 2 is equipped with an onboard system 4 comprising an image sensor 6 (here a video camera), an emitter circuit 8 (for instance an UGDO transceiver) and a control module 10.

The image sensor 6 is directed towards the driver D of the vehicle 2 and is therefore suited to capture a sequence of images S showing at least part (of the body) of the driver D (for instance at least a space in which the driver D is expected to gesture his hands, or the face of the driver D in the respective examples given below).

The emitter circuit 8 is suited to send the above-mentioned wireless command C (with valid credentials) when receiving a corresponding instruction I from the control module 10 (for instance via a bus connecting the control module 10 to the emitter circuit 8).

In the present embodiment, the wireless command C is a sub GHz radiofrequency signal (i.e. a radiofrequency signal having a main frequency below 1 GHz) suitable to be received by the mechanism 26. According to a possible variation, the wireless command C could be sent via a wireless datalink established between the emitter circuit 8 and the mechanism 26 (such as a Bluetooth datalink), or via a wireless local area network (WLAN).

In addition, in another possible context, the emitter circuit 8 could also send another wireless command to control a comfort equipment (e.g. a garage lighting) associated with the access system (or, in another embodiment, independent of the access system).

As will be further explained below with referenced to FIG. 2, the control module 10 is suited to process said sequence of images S so as to identify a behavioral feature of the driver D and to control the emitter circuit 8 to send the wireless command C to the park area access system 22 (by issuing the instruction I mentioned above) provided the identified behavioral feature corresponds to a predetermined behavioral feature.

Figure 2:
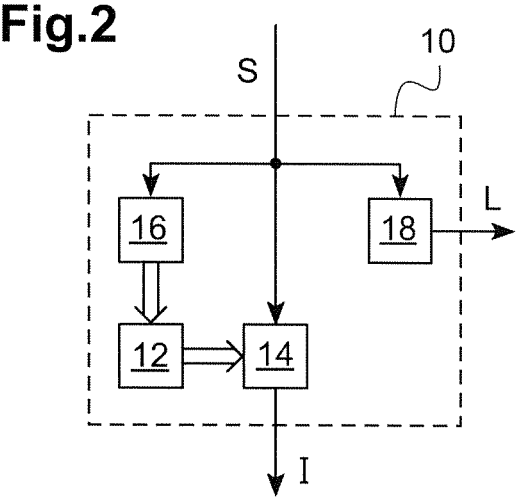
FIG. 2 schematically shows functional elements of a control module used in an embodiment of the invention.

FIG. 2 schematically shows functional elements of the control module 10.

In practice, some of these elements (such as units 14, 16, 18 described below) may each be implemented by the execution of a specific set of computer program instructions on a processor of the control module 10. These computer program instructions are for instance stored in a memory 12 of the control module 10.

In the present embodiment, the memory 12 also stores a plurality of data representations corresponding each to a behavioral feature of the driver D. Each data representation is furthermore associated with a particular command that may be sent by the emitter circuit 8, here by storing in the memory 12 a table (e.g. in the form of a matrix) associating each data representation to a particular command (the possible commands thus forming dictionary of commands).

The control module 10 comprises an association unit 14 suited to process (e. g. analyze) the sequence of images S (received from the image sensor 6) associate it to a behavioral feature corresponding to one of the stored data representation (when the driver D behaves in accordance with such behavioral feature). Identification of the behavioral feature is for instance performed by processing the sequence of images S to obtained representative data and by comparing these representative data to each of the data representations stored in the memory 12.

According to the proposed embodiment, the behavioral feature is a particular gesture of the driver D. According to a possible variation, the behavioral feature may be a particular movement of the lips of the driver D.

Once such a behavioral feature is identified in the sequence of image S (identified as a specific one in the data representations stored in the memory 12), the association unit 14 associates this behavioral feature to a specific command (i.e. the command associated with the particular data representation in the table mentioned above). This command may for instance be the wireless command C mentioned above.

In practice, upon associating the representative data identified from the sequence of images S to the wireless command C, the association unit 14 sends the instruction I to the emitter circuit 8 via the bus, which results in the emitter circuit 8 sending the wireless command C to the park area access system 22 and thus to open the garage door 24.

The operation of the association unit 14 as just mentioned occurs in a "normal usage" mode.

In a "training" mode (distinct from the "normal usage" mode), the association unit 14 is deactivated and the sequence of images S is received by a training unit 16 (also part of the control module 10).

The training unit 16 (which operates in the "training" mode only) is suited to capture an image sequence S (i.e. a set of sequenced images) showing a behavioral feature of the driver D, to process the captured image sequence S into a corresponding data representation and to record the resulting data representation in the memory 12.

In practice, a specific command to be emitted by the emitter circuit 8 (such as the wireless command C) may for instance be selected by the driver D. This selection could be performed by selecting the name of this command on a user interface (not shown) provided in the vehicle 2.

While in "training" mode, the driver then behaves in a specific manner (e.g. makes a particular gesture in the present example), that is captured by the image sensor 6.

The image sensor 6 thus delivers a sequence of images S showing this particular behavioral feature. As noted above, this sequence of images S is processed by the training unit 16 to produce a corresponding data representation, which is then stored in the memory 12 and associated to the command selected by the driver D.

Various data representations (that each correspond to a corresponding behavioral feature) can be stored in the memory 12 in association to respective commands (including the wireless command C to be sent to the park area access system 22 to command its operation, i.e. here to command opening the garage door 24).

In the embodiment described here, the control module 10 is embedded in a driver monitoring unit 18 (operable in particular in the "normal usage" mode).

The driver monitoring unit 18 analyzes the sequence of images S and produces (based on this analysis) a driving ability level L. This driving ability level L can be representative of the ability of the driver D to drive the vehicle 2, or of the inability of the driver D to drive the vehicle 2. In this respect, the driving ability level L could be a distraction level or a drowsiness level.

The driver monitoring unit 18 may for instance determine the distraction level by evaluating the gaze direction of the driver D and the variation of this gaze direction over time. The driver monitoring unit 18 may for instance determine the drowsiness level based on the frequency and/or the duration of the driver's eyes blinking.

The invention claimed is:

1. An onboard system for a vehicle comprising:
an emitter circuit for sending a command selected by a driver of the vehicle to a park area access system;
an image sensor for capturing a first sequence of images of at least part of a body of the driver of the vehicle; and
a control module selectively operating in a training mode and a normal usage mode, the control module:
processing said first sequence of images so as to identify a behavioral feature and then control the emitter circuit to send the command to the park area access system when the identified behavioral feature corresponds to a predetermined behavioral feature;
in the training mode, acquiring a second sequence of images to create a corresponding data representation of said predetermined behavioral feature, wherein the corresponding data representation is stored in a memory and is mapped to the command selected by the driver; and in the normal usage mode, associating the identified behavioral feature with said command among a plurality of commands, wherein in the training mode, the associating of the identified behavioral feature with said command is deactivated, and wherein the control module performs the acquiring of the second sequence of images to create the corresponding data representation of said predetermined behavioral feature and the associating of the identified behavioral feature with said command to produce a driving ability level representative of a distraction level or a drowsiness level of the driver.

2. The onboard system according to claim 1, wherein the predetermined behavioral feature is a predetermined gesture.

3. The onboard system according to claim 1, wherein the predetermined behavioral feature is a predetermined lip movement.

4. A method of sending a command to a park area access system, comprising:

capturing, by an image sensor, a first sequence of images of at least part of a body of a vehicle driver;

processing said first sequence of images so as to identify a behavioral feature;

controlling an emitter circuit to send the command to the park area access system provided the identified behavioral feature corresponds to a predetermined behavioral feature, wherein the command is selected by the driver of the vehicle;

selecting a mode between a normal usage mode and a training mode;

in the normal usage mode, associating the identified behavioral feature with the corresponding command among a plurality of commands;

in the training mode, acquiring, by a control module, a second sequence of images to create a corresponding data representation of said predetermined behavioral feature performed by the driver, wherein in the training mode, the associating of the identified behavioral feature with said command is deactivated;

storing the corresponding data representation in a memory and mapping the corresponding data representation to the command selected by the driver; and producing a driving ability level, representative of a distraction level or a drowsiness level of the driver, based on the acquiring of the second sequence of images to create the corresponding data representation of said predetermined behavioral feature and the associating of the identified behavioral feature with the corresponding command.

5. The method according to claim 4, wherein the predetermined behavioral feature is a predetermined gesture.

6. The method according to claim 4, wherein the predetermined behavioral feature is a predetermined lip movement.

7. The method according to claim 4, further comprising:

receiving said command at said park area access system; and operating a mechanism of said park area access system when receiving said commend, thereby enabling the vehicle access to said park area.

8. The onboard system according to claim 1, wherein the driving ability level is representative of the distraction level of the driver, and the distraction level is further based on a gaze direction of the driver.

9. The onboard system according to claim 1, wherein the driving ability level is representative of the drowsiness level of the driver, and the drowsiness level is based on eye blinking of the driver.

10. The method according to claim 4, wherein the driving ability level is representative of the distraction level of the driver, and the distraction level is based on a gaze direction of the driver.

11. The method according to claim 4, wherein the driving ability level is representative of the drowsiness level of the driver, and the drowsiness level is based on eye blinking of the driver.

* * * * *